United States Patent
Dwiggins

[19]

[11] Patent Number: 5,992,468
[45] Date of Patent: Nov. 30, 1999

[54] CABLE ANCHORS

[75] Inventor: Jeffrey L. Dwiggins, Windsor, United Kingdom

[73] Assignee: Camco International Inc., Houston, Tex.

[21] Appl. No.: 08/898,054

[22] Filed: Jul. 22, 1997

[51] Int. Cl.⁶ ................................................. F16L 55/00
[52] U.S. Cl. ..................... 138/108; 138/112; 138/131; 138/135
[58] Field of Search .................... 138/108, 112, 138/113, 131, 135; 166/241.1, 385; 174/72 A, 72 TR, 104, 135, 168

[56] References Cited

U.S. PATENT DOCUMENTS

| | | | |
|---|---|---|---|
| 2,325,616 | 8/1943 | Landweber | 138/108 |
| 2,368,737 | 2/1945 | Badgley . | |
| 3,758,701 | 9/1973 | Schmidt | 138/113 |
| 3,835,929 | 9/1974 | Suman, Jr. . | |
| 4,004,888 | 1/1977 | Musall et al. | 138/108 |
| 4,250,927 | 2/1981 | Newburg | 138/113 |
| 4,336,415 | 6/1982 | Walling . | |
| 4,346,256 | 8/1982 | Hubbard et al. . | |
| 4,440,154 | 4/1984 | Bellows | 138/108 |
| 4,456,058 | 6/1984 | Powell | 138/112 |
| 4,607,665 | 8/1986 | Williams | 138/108 |
| 4,681,169 | 7/1987 | Brookbank, III . | |
| 4,830,105 | 5/1989 | Petermann | 166/241 |
| 4,830,113 | 5/1989 | Geyer . | |
| 5,145,007 | 9/1992 | Dinkins . | |
| 5,146,982 | 9/1992 | Dinkins . | |
| 5,180,014 | 1/1993 | Cox . | |
| 5,191,173 | 3/1993 | Sizer et al. . | |
| 5,193,614 | 3/1993 | Cox . | |
| 5,269,377 | 12/1993 | Martin . | |
| 5,435,351 | 7/1995 | Head | 138/113 |

*Primary Examiner*—James F. Hook
*Attorney, Agent, or Firm*—Fletcher, Yoder & Van Someren

[57] ABSTRACT

A cable and conduit assembly comprises a conduit, such as coiled tubing, with a cable, such as an electrical power cable, longitudinally disposed therein. A plurality of elastic fingers, such as relatively short lengths of spring steel, extend from the cable and frictionally engaging an interior surface of the conduit to transfer the weight of the cable to the conduit. The elastic fingers are angled to permit installation of the cable within the conduit in a first longitudinal direction and to prevent movement of the cable within the conduit in a second longitudinal direction.

12 Claims, 2 Drawing Sheets

CABLE ANCHORS

BACKGROUND OF THE INVENTION

1. Field of the Invention

The present invention relates to devices used to restrain the movement of a cable that is disposed within a conduit and, more particularly, to cable anchors used within coiled tubing to suspend an electric submergible pumping system within a wellbore.

2. Description of Related Art

To reduce the size of equipment and the associated costs needed to deploy and recover an electric submergible pumping system ("ESP"), ESP's can be suspended from coiled tubing, rather than conventional jointed tubing. This method takes advantage of the relatively low cost and ease of transportation of the units used to install and remove coiled tubing. A typical arrangement for suspending an ESP on coiled tubing is disclosed in U.S. Pat. Nos. 3,835,929; 4,830,113; and 5,180,014.

The cable that is used to connect the ESP to a surface power source does not have sufficient internal strength to support its own weight over about 60 to 200 feet. Therefore, the cable is clamped, banded or strapped to the jointed tubing or the coiled tubing at intervals of about every 50 to 150 feet, as disclosed in U.S. Pat. No. 4,681,169. Alternatively, the cable can be encased within the coiled tubing, as disclosed in U.S. Pat. Nos. 4,336,415; 4,346,256; 5,145,007; 5,146,982; and 5,191,173.

When the cable is encased within the coiled tubing, standoff devices can be used to centralize the cable within the coiled tubing to permit fluid production through the coiled tubing. These standoff devices also support the cable, in place of the external clamps or straps, by preventing longitudinal movement of the cable with respect to the coiled tubing and thereby transfer the weight of the cable to the coiled tubing. These standoff devices are usually referred to as "cable anchors", and are disclosed in U.S. Pat. Nos. 5,193,614; 5,269,377; and 5,435,351.

Common problems associated with the prior cable anchors are that such cable anchors are either (i) relatively mechanically complex, and require injection of a solvent to release the anchors, or (ii) require a time consuming and uncontrollable chemical interaction to cause elastomeric materials to swell. There is a need for a simple mechanical cable anchor assembly that is quickly and predictably operable, and is not dependent upon the uncertain nature of chemical interactions and solvents.

SUMMARY OF THE INVENTION

The present invention has been contemplated to overcome the foregoing deficiencies and meet the above described needs. Specifically, the present invention comprises a conduit, such as coiled tubing, with a cable, such as an electrical power cable, longitudinally disposed therein. A plurality of elastic fingers, such as relatively short lengths of spring steel, extend from the cable and fictionally engage an interior surface of the conduit to transfer the weight of the cable to the conduit. The elastic fingers are angled to permit installation of the cable within the conduit in a first longitudinal direction and to prevent movement of the cable within the conduit in a second longitudinal direction.

With the cable anchors of the present invention there is no manipulation or "activation" required to transfer the weight of the cable to the conduit, as in prior systems. In addition, the present cable anchors having no moving parts, thereby providing a simple and less costly solution than prior systems.

DETAILED DESCRIPTION OF THE PREFERRED EMBODIMENTS

As described briefly above, the present invention comprises a conduit, such as coiled tubing, with a cable, such as an electrical power cable, longitudinally disposed therein. A plurality of elastic fingers, such as relatively short lengths of spring steel, extend from the cable and frictionally engage an interior surface of the conduit to transfer the weight of the cable to the conduit. The elastic fingers are angled to permit installation of the cable within the conduit in a first longitudinal direction and to prevent movement of the cable within the conduit in a second longitudinal direction.

For the purposes of the present discussion it will be assumed that the cable anchor of the present invention is used within coiled tubing; however, it should be understood that the cable anchor of the present invention can be used with any type of conduit, such as jointed tubing and the like. Further, for the purposes of the present discussion it will be assumed that the cable anchor of the present invention is used with electrical power cable connected to an ESP; however, it should be understood that the cable anchor of the present invention can be used with any type of conduit, cable, wire or rope, such as fiber optics, hydraulic control lines, and the like, as well as for providing communications to and from or conveying and retrieving equipment, such as logging tools, drilling tools, wireline tools, steam generators and the like, within a wellbore.

Figure 1:
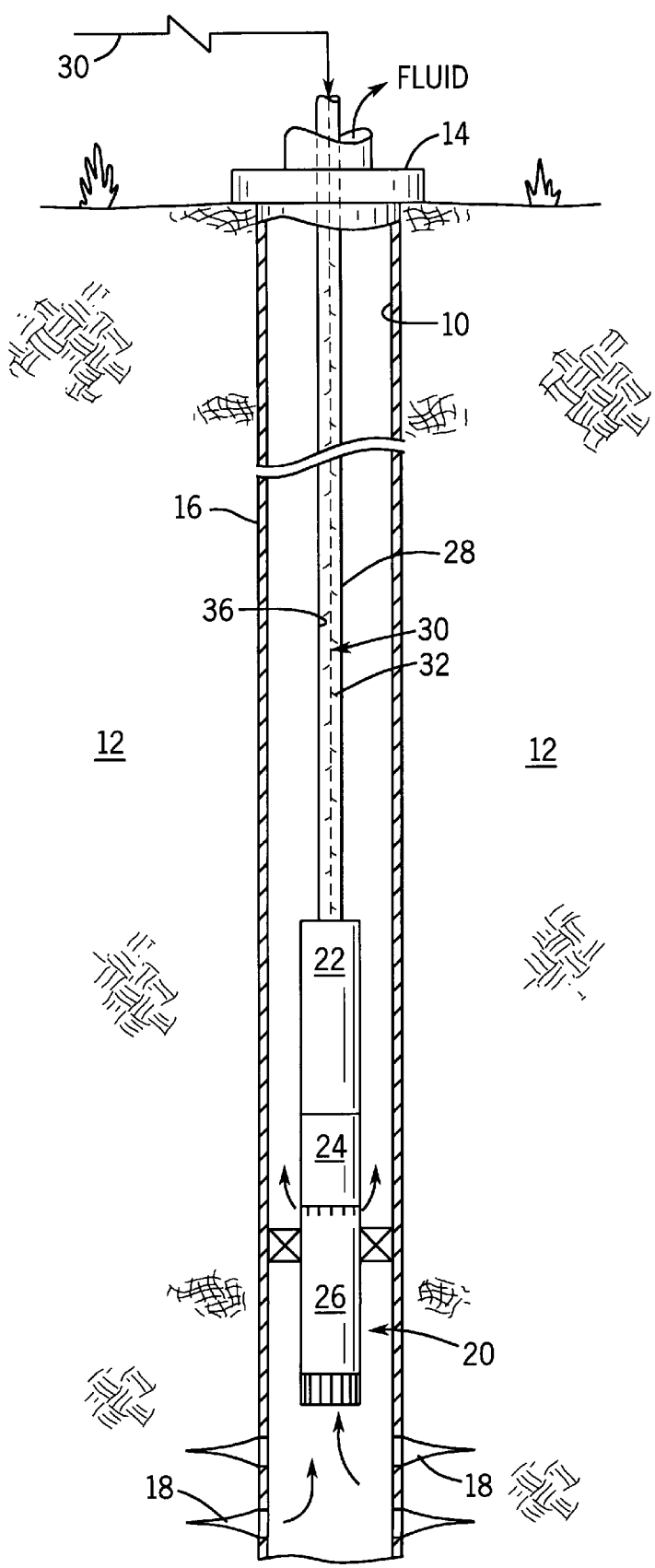
FIG. 1 is a partial cross section elevational views of a subterranean wellbore with an ESP suspended on coiled tubing therein, and with a plurality of cable anchors of the present invention clamped about a power cable disposed within the coiled tubing.

To better understand the present invention, reference will be made to the accompanying drawings. FIG. 1 shows a wellbore 10, used for recovering fluids such as water and/or hydrocarbons, that penetrates one or more subterranean earthen formations 12. The wellbore 10 includes a wellhead 14 removably connected to an upper portion of a production tubing and/or casing string 16, as is well known to those skilled in the art. If the casing string 16 extends across a fluid producing subterranean formation 12, then the casing string 16 can include at least one opening or perforations 18 for permitting fluids to enter the interior thereof. An electric submergible pumping system ("ESP") 20 is shown suspended within the casing string 16, and generally includes an electric motor 22, an oil-filled motor protector 24, and a pump 26. The ESP 20 is shown in FIG. 1 in an "upside down" configuration, commonly known as a "bottom intake system"; however, it should be understood that the present invention can be used when the ESP 20 is deployed in a "conventional" configuration, with the motor 22 below the pump 26.

For the purposes of this discussion, the terms "upper" and "lower", "above" and "below", "uphole" and "downhole", and "upwardly" and "downwardly" are relative terms to indicate position and direction of movement in easily recognized terms. Usually, these terms are relative to a line drawn from an upmost position at the surface of the earth to a point at the center of the earth, and would be appropriate for use in relatively straight, vertical wellbores. However, when the wellbore is highly deviated, such as from about 60 degrees from vertical, or horizontal, these terms do not make sense and therefore should not be taken as limitations. These terms are only used for ease of understanding as an indication of what the position or movement would be if taken within a vertical wellbore.

The ESP 20 is operatively connected to a lower end of a length of conduit 28 that has been spooled into the casing 16, as is well known to those skilled in the art. The conduit 28 can be of any commercially available size (i.e. outside/inside diameter) and formed from any material suitable to the wellbore conditions, as all is well known in the art. For examples, typical sizes of coiled tubing are from 0.75" OD to 3.5" OD, and are made from aluminum, steel and titanium.

An electrical cable 30 is operatively connected to the ESP 20 to provide electrical power to the motor 22, and is operatively connected at the surface to surface electrical control equipment and a source of electrical power (both not shown), as are both well known in the art. Commercially available electrical cable 30 typically used with ESP's 20 does not have sufficient internal strength to support its own freely suspended weight; therefore, a plurality of cable anchors 32, of the present invention, are shown inserted within the conduit 28. The cable anchors 32 are used to support the weight of the cable 30, and provide as open of an annulus 34 as possible between the cable 30 and the interior surface of the conduit 28 to permit greater flow of fluids within the conduit 28, if desired. However, in the arrangement shown in FIG. 1, wellbore fluids are pumped to the earth's surface outside of the conduit 28 and within the annulus of the casing 16. The cable anchors 32 can centralize the cable 30 within the conduit 28, or displace the cable to one side, as is desired. Again, depending upon the type and diameter of the cable 30, the cable anchors 32 are spaced about every 50–200 feet.

Figure 2:
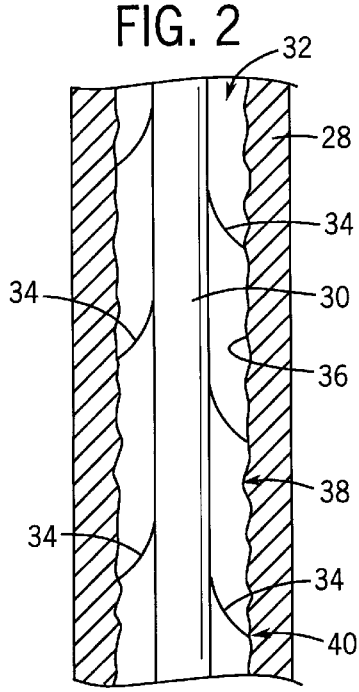
FIG. 2 is a partial cross-section elevational view of a conduit with one preferred embodiment of a cable anchor of the present invention installed therein.

FIG. 2 shows one preferred embodiment of a cable anchor 32 of the present invention wherein a plurality of elastic fingers 34 extend from and are attached to the cable 30. The elastic fingers 34 preferably comprise relatively short lengths of robust material, such as metal, ceramic, carbon fiber, and the like. Most preferably, the elastic fingers comprise generally rectangular strips of spring steel. As used herein, the term "elastic" refers to a material that has the ability to resist tension, torsion, shearing or compression and to recover its original shape and size when the stress is removed. More specifically, the "elastic" fingers should be able to bend or deform, if need be, when the cable 30 is being installed into the conduit 28, and then return to their intended shape or position to resist longitudinal movement of the cable 30 with respect to the conduit 28 once installed. As shown in FIG. 2, each of the elastic fingers 34 are bent or "angled" in such a way to permit installation of the cable 30 into the conduit 28 (as will be described in detail below) in a first longitudinal direction and to prevent movement of the cable 30 with respect to the conduit 28 in a second longitudinal direction. More specifically, the elastic fingers 34 are angled so as to engage the interior surface 36 of the conduit 28, to transfer the weight of the cable 30 to the conduit 28, and to prevent the cable 30 from slipping downwardly within the conduit 28.

Figure 5:
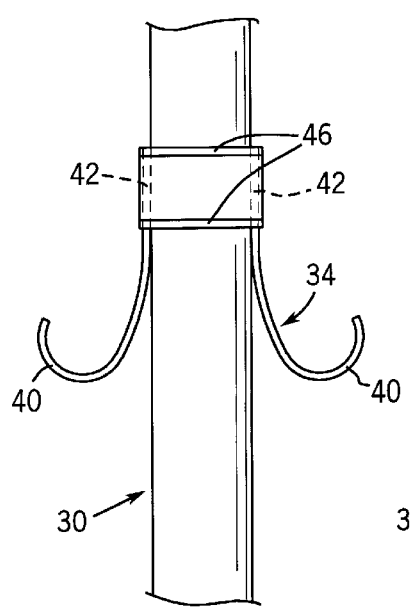

In the configurations shown in FIGS. 1 and 2, a plurality of the elastic fingers 34 are attached to the cable 28. These elastic fingers 34 can be attached with only one finger extending out from the cable at a particular longitudinal location, or several fingers can extend out from the cable at the same longitudinal location, for example, such as shown in FIG. 5. The elastic fingers 34 can be attached at the same radial position at each depth along the cable 28 to bias the cable 28 against one side of the conduit 28. Additionally, the elastic fingers 34 can be attached in a helical pattern along the length of the cable 28.

In one preferred embodiment of the present invention, shown in FIG. 2, an interior surface 36 of the conduit 28 includes, optionally, a plurality of serrations 38, which can comprise one or more helical, lateral or annular grooves, ridges, or areas of a roughened or textured surface. These serrations 38 are created during the rolling of the material that forms the conduit 28 or thereafter but before the cable 30 is installed thereinto. An outer end 40 of the elastic fingers 34 are shaped so as to frictionally engage the serrations 38, such as by landing into a trough or abutting a ridge on the interior surface 36 of the conduit 28. Such outer ends 40 can be curved to match the curvature of the interior surface 36 of the conduit 28 and/or include grooves or teeth to better grip or dig into the conduit 28.

Figure 3:
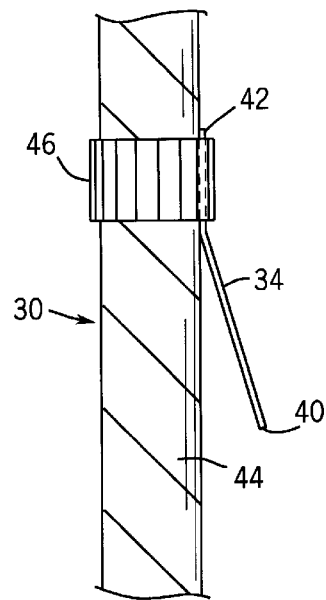
FIGS. 3–7 are elevational views of alternate preferred embodiments of cable anchors of the present invention.
Figure 4:
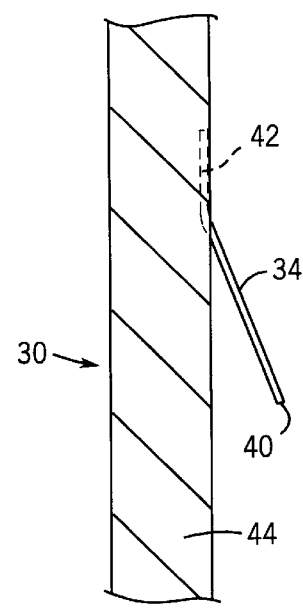

The elastic fingers 34 can be made in any desired configuration and can be attached to the cable 30 in several ways. FIG. 3 shows an elastic finger 34 as comprising a simple rectangular strip of material, such as spring steel, with a bend therein to place the outer end 40 into frictional contact with the interior surface 36 of the conduit 28. An inner end portion 42 of each of the elastic fingers 34 is attached to the cable 30 in any known manner, such as by one or more rivets, glue, welding to a metallic armor 44 on the cable 30, and one or more metallic or elastomeric straps, bands, and clamps 46. In FIG. 4, the inner end portion 42 of the elastic finger 34 is shown tucked into a seam in the armor 44. The inner end portion 42 can be rigidly held in place under the armor 44 by the strength of the armor 44, or preferably by an additional internal strap around the cable jacket inside of the armor or by an external strap or clamp 46 around the exterior of the cable 28.

FIG. 5 shows a preferred embodiment where the outer ends 40 of the elastic fingers 34 are curved or spiraled. Preferably, the thickness of the material that forms the elastic fingers 34 will increase towards the outer ends 40 to resist bending or rolling of the outer ends 40 to better frictionally engage the interior surface 36 of the conduit 28. When the cable 30 is inserted into the conduit 28 the outer ends 40 of the elastic fingers 34 will tend to unroll. When the conduit 28 and cable 30 are installed in the wellbore, the cable 30 will tend to move downwardly within the conduit 28, and the elastic fingers 34 will tend to bend or roll upwardly and thereby stop the downward movement or "slippage". Further, to assist in preventing slippage of the cable, the surface of the outer ends 40 that contacts the interior surface 36 of the conduit 28 can include a plurality of serrations, such as lateral grooves, ridges, or areas of a roughened or textured surface. The inner end portions 42 of the elastic fingers 34 are attached to the cable 28 by any of the means described previously.

Figure 6:
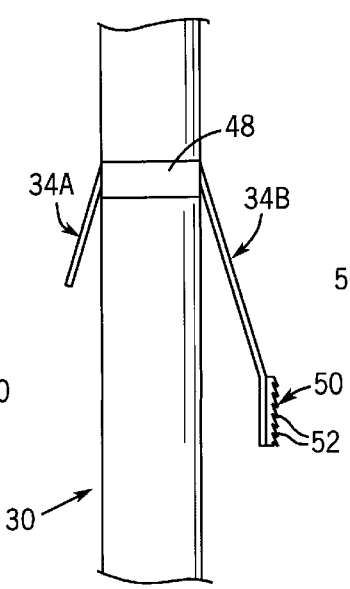

The preferred embodiment shown in FIG. 6 has two or more elastic fingers 34 extending out from a cylindrical band 48. The band 48 is slipped over the cable 28 and then is attached thereto by any of the above described attachment means. The inner end portions 42 of the elastic fingers 34 can be formed as an integral part of the band 48, or they can be attached thereto, again, by any of the above described attachment means. One of the elastic fingers 34A is in the form of the preferred embodiments shown in FIGS. 2–4, or it may be in the form as shown in FIG. 5. A second of the elastic fingers 34B includes at its outer end portion means for better frictionally engaging the interior surface 36 of the conduit 28. Such means can comprise a block 50 of metallic material, such as steel or bronze, ceramic material, or elastomeric, thermoplastic or thermoset material. The block 50 can include one or more serrations 52 to better frictionally engage the interior surface 36 of the conduit 28.

Preferred elastomeric materials for the block 50 are ethylene propylene diene methylene terpolymer ("EPDM") or polypropylene rubber. Preferred thermoplastic materials are acrylonitrilebutadiene-styrene (ABS) copolymers, acetals, tetrafluroethylene-propylene copolymers, hexafluropropylene-vinylidene copolymers, polyamides, arimids, polyaryl sulfones, polyaryl ethers, polyesters, polyether sulfones, polyimides, polyamide-imides, polyphenylene sulfide, polysulfones, polyetherketones, polyetheretherketones, polyetherketonesetheretherketones, polyaryletherketones, polyethylenes, polypropylenes, epoxies, and copolymers, mixtures, blends and alloys thereof. Preferred thermoset materials are copolymers of acrylonitrile and butadiene, saturated copolymers of acrylonitrile and butadiene, fluroelastomers, polychloroprenes, and copolymers, mixtures, blends and alloys thereof.

Figure 7:
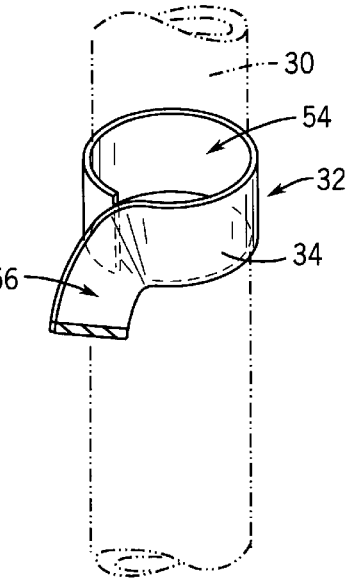

Another preferred embodiment of a cable anchor 32 is shown in FIG. 7 wherein an elastic finger 34 is formed from one or more pieces of elastic material, as previously described, and is bent as a single unit to have a cylindrical or curved portion 54 adapted to have the cable 30 pass there through, and an outer finger portion 56 adapted to frictionally engage the interior surface 36 of the conduit 28, as previously described. The cable anchor 32 shown in FIG. 7 is attached to the cable 30 in any of the above described means. The configuration of this cable anchor 32 is such that the finger portion 56 engaging the conduit 28 is push upwardly on the curved portion 54 tilting the curved portion 54 so its longitudinal axis is not parallel to the longitudinal axis of the cable 30, and/or compressing the curved portion 54 to reduce its radius. In either case, any downward movement or "slippage" of the cable 30 will tend to cause the cable anchor 32 to more securely grip the cable 30.

In one preferred embodiment of the present invention, the cable 30 is inserted into the conduit 28, such as coiled tubing, by any of the methods as described in the above referenced prior patents. This can take place during the manufacture of the coiled tubing or in the field. One preferred filed method is to unspool the coiled tubing on the ground, run a guide wire there through, attach one end of the guide wire to the cable and attach the other end of the guide wire to a vehicle. The cable is coated with a friction-reducing agent, such as grease or oil, and the vehicle is then moved to pull the cable into the coiled tubing. An alternative is to include the guide wire during the manufacture of the coiled tubing.

Once the cable 30 has been inserted into the conduit 28, one end thereof, which will be the lowermost end adjacent the ESP 20, extends out from one end of the conduit 28 and is sealed, such as by a sealing connector and/or cap, as is well known to those skilled in the art. The cable-filled conduit 28 is then respooled, and transported into position adjacent the wellbore 10.

The ESP 20 is connected to the lower end of the conduit 28, as is well known to those skilled in the art, and the lower end of the electric cable 30 is operatively connected to the motor 22. The ESP 20 is lowered into the wellbore 10, such as by the use of an injector head (not shown), as is well known to those skilled in the art. The upper end of the conduit 28 is sealed by the wellhead 14, as is well known to those skilled in the art, and the upper end of the cable 30 is operatively connected to a power source.

An alternate preferred method of installing the cable 30 within the conduit 28 comprises including one or more tubes within the cable 30, as is well known to those skilled in the art, or attached to the outside thereof. The cable 28 is pulled through the conduit 28 as before, a bottom end of the conduit 28 is sealed, and then a fluid is injected through one of the tubes into the conduit 28. A variation on this method is to pump a fluid into the conduit 28 after the cable 30 is installed therein by way of one of the tubes in the cable, and permit air to simultaneously escape out through another of these tubes. The use of one or more tubes permits relatively easy removal and addition of the fluid and/or additives to the fluid to change its density.

Another preferred method of installing the cable 30 within the conduit 28 comprises sealing a lower end of the cable 30 within the conduit 28, and then pumping a fluid, such as air, into the conduit 28 to hydraulically push the cable 30 into and through the conduit 28.

Wherein the present invention has been described in particular relation to the drawings attached hereto, it should be understood that other and further modifications, apart from those from those shown or suggested herein, may be made within the scope and spirit of the present invention.

What is claimed:

1. A cable anchor for use in supporting a cable within a conduit, comprising:

an elastic finger having a normal outwardly extended position unbound at a free end thereof during deployment and use and being deformable by contact with an interior surface of a conduit for installation of the cable therein, the elastic finger having means at one end thereof for attachment to a cable, and having an opposite free end thereof adapted for slidingly engaging the interior surface of the conduit when the elastic finger is displaced in a first longitudinal direction therein and for supportingly engaging the interior surface of the conduit when the elastic finger is displaced in a second longitudinal direction opposite from the first direction thereby to prevent the cable from moving longitudinally in the second direction within the conduit.

2. A cable anchor of claim 1 wherein the elastic finger further comprises a generally rectangular strip of elastic material.

3. A cable anchor of claim 2 wherein the elastic material is spring steel.

4. A cable anchor of claim 1 wherein the elastic finger further comprises a strip of elastic material wherein the opposite end thereof is angled outwardly.

5. A cable anchor of claim 1 wherein the elastic finger further comprises a strip of elastic material wherein the opposite end thereof is curved.

6. A cable anchor of claim 1 wherein the elastic finger further comprises a strip of elastic material wherein the opposite end includes means for engaging the interior surface of the conduit.

7. A cable anchor of claim 6 wherein the engaging means comprises a block of material with serrations.

8. A cable anchor of claim 1 wherein the means for attachment comprises glue.

9. A cable anchor of claim 1 further comprising a clamp body secured to the elastic finger and configured to be attached to the cable.

10. A cable anchor of claim 1 wherein the cable includes an outer metallic armor, and the one end of the elastic finger is inserted under the metallic armor.

11. A cable and conduit assembly, comprising:

a conduit having a cable longitudinally disposed therein;

a plurality of cable anchors spaced along and attached to the cable for transferring the weight of the cable to the conduit; and a portion of the cable anchors comprising elastic members having means at one end thereof for attachment to the cable, and having an opposite free end thereof which is unbound and outwardly extending during deployment and use, the free end being adapted for slidingly engaging an interior surface of the conduit in a first longitudinal direction and for supportingly engaging the interior surface of the conduit in a second longitudinal direction opposite from the first direction.

12. A cable and conduit assembly of claim 11 further comprising serrations on the interior surface of the conduit for engaging the elastic members, thereby supporting the cable in the conduit.

* * * * *